No. 724,625. PATENTED APR. 7, 1903.
J. V. STEENBERGEN.
DIVIDERS.
APPLICATION FILED OCT. 4, 1902.
NO MODEL.

Inventor
J. V. Steenbergen,

Witnesses
By
Attorneys

UNITED STATES PATENT OFFICE.

JACOB V. STEENBERGEN, OF HARRISBURG, SOUTH DAKOTA.

DIVIDERS.

SPECIFICATION forming part of Letters Patent No. 724,625, dated April 7, 1903.

Application filed October 4, 1902. Serial No. 125,919. (No model.)

*To all whom it may concern:*

Be it known that I, JACOB V. STEENBERGEN, a citizen of the United States, residing at Harrisburg, in the county of Lincoln, State of South Dakota, have invented certain new and useful Improvements in Dividers; and I do hereby declare the following to be a full, clear, and exact description of the invention, such as will enable others skilled in the art to which it appertains to make and use the same.

This invention relates to dividers; and it has for its object to provide a construction wherein there is provided a scale for determining the separation of the points of the dividers and means for holding the legs of the dividers positively in their adjusted positions.

A further object of the invention is to provide a construction wherein after the legs of the instrument are clamped they may be adjusted toward and away from each other within certain limits to rectify them or for other purposes.

Figure 1:
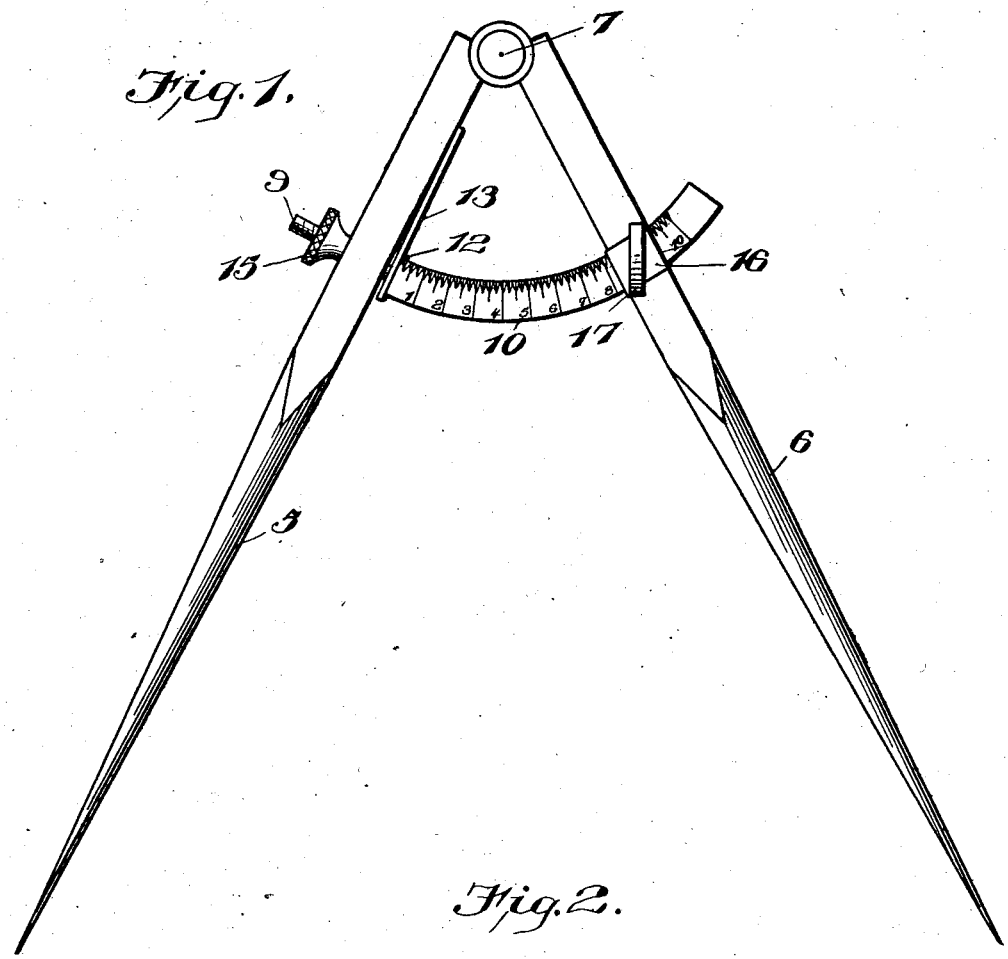
Figure 2:
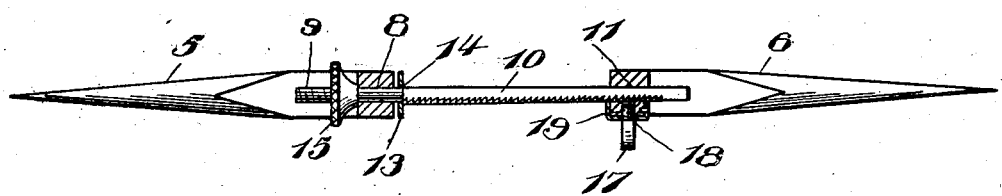

In the drawings forming a portion of this specification, and in which like numerals of reference indicate similar parts in both views, Figure 1 is a plan view showing the dividers. Fig. 2 is a section taken through both legs of the dividers and conforming to the curvature of the scale.

Referring now to the drawings, there is shown a pair of dividers including the legs 5 and 6, having a hinge connection 7 at one end and the opposite or free ends of which in the present instance are pointed. Through the leg 5 is formed a perforation 8, in which is slidably engaged the reduced end 9 of an arc-shaped scale 10, the opposite end of which is slidably engaged in the slot 11 in the legs 6 to permit of free movement at times of the legs toward and away from each other. The reduced end portion of the arc-shaped scale has shoulders 12 at its inner end, and against these shoulders rests the end of a spring-plate 13, which is riveted to the inner face of the leg 5 and has an opening 14 at its free end, through which the reduced end of the scale is passed. The reduced end portion of the scale at the opposite side from the spring-plate is screw-threaded and has engaged therewith a thumb-nut 15, by manipulation of which the reduced portion of the scale may be drawn through the leg 5 against the tendency of the spring, or the scale may be released to permit of movement thereof longitudinally in the opposite direction by the spring.

In one face of the leg 6 is secured at one end a spring-plate 16, which projects beyond the inner face of said leg and is then bent at right angles to lie between the legs, this inwardly-bent portion having a sharpened edge to engage in the marks of the scale interchangeably to hold the scale against longitudinal movement through the slot of the leg 6. To move the spring 16 into engagement with the scale and hold it in its engaging position, a thumb-screw 17 is provided, which is passed loosely through the perforation 18 of the spring-plate and engaged in the threaded perforation 19 in the leg of the dividers, the edge of the spring-plate 16 acting as a gage up to which a mark upon the scale must be brought to give a corresponding separation of the points of the dividers. With this construction it will be seen that the dividers may be adjusted to a fine degree of accuracy and may be held securely in their adjusted positions. The thumb-screw provides for rectifying the dividers, as also for adjusting them to a slight degree in the taking of measurements.

In practice modifications may be made and any suitable materials and proportions may be used for the various parts without departing from the spirit of the invention.

What is claimed is—

The combination with a pair of dividers comprising legs pivotally connected, of a scale connected with one of the legs and slidably engaged through the other, the marks of the scale being depressed, a spring-plate attached to the upper face of the second leg, having a knife-edge projecting in the direction of the screw and adapted to engage the depressions thereof interchangeably, the leg and the plate having alining perforations therethrough, the perforation in the leg being threaded, a thumb-screw passed through the perforation in the plate and engaged with the threads of the perforation in the leg, and a flange on the shank of the screw to engage the upper face of the spring-plate and move the plate in the direction of the scale.

In testimony whereof I affix my signature in presence of two witnesses.

JACOB V. STEENBERGEN.

Witnesses:
J. P. LANGNO,
H. BAXTER.